Figure 1:
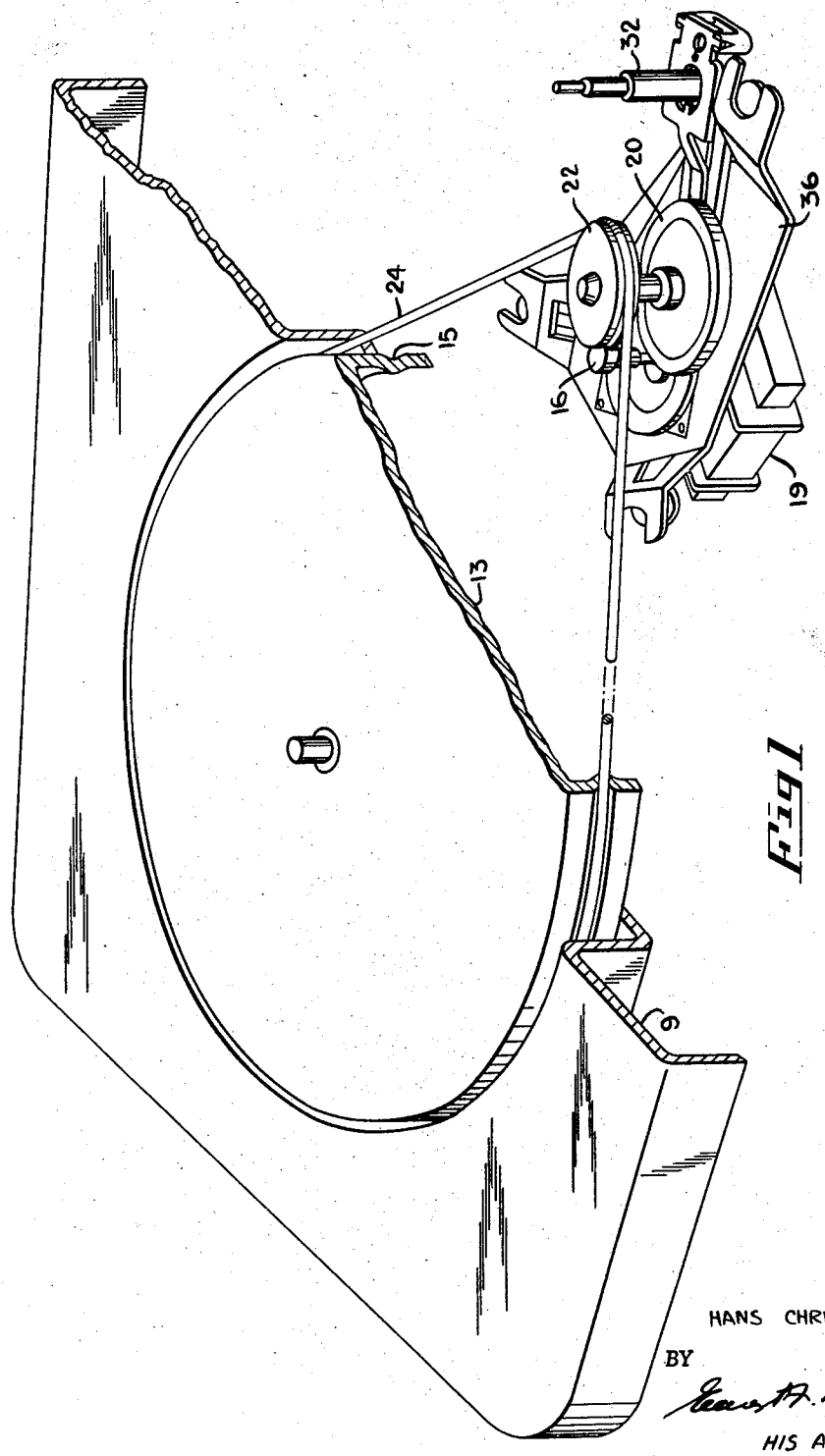

June 23, 1959 H. C. HANSEN 2,891,409
RECORD CHANGING PHONOGRAPHS

Original Filed May 12, 1951 2 Sheets-Sheet 1

INVENTOR:
HANS CHRISTIAN HANSEN,
BY

HIS ATTORNEY.

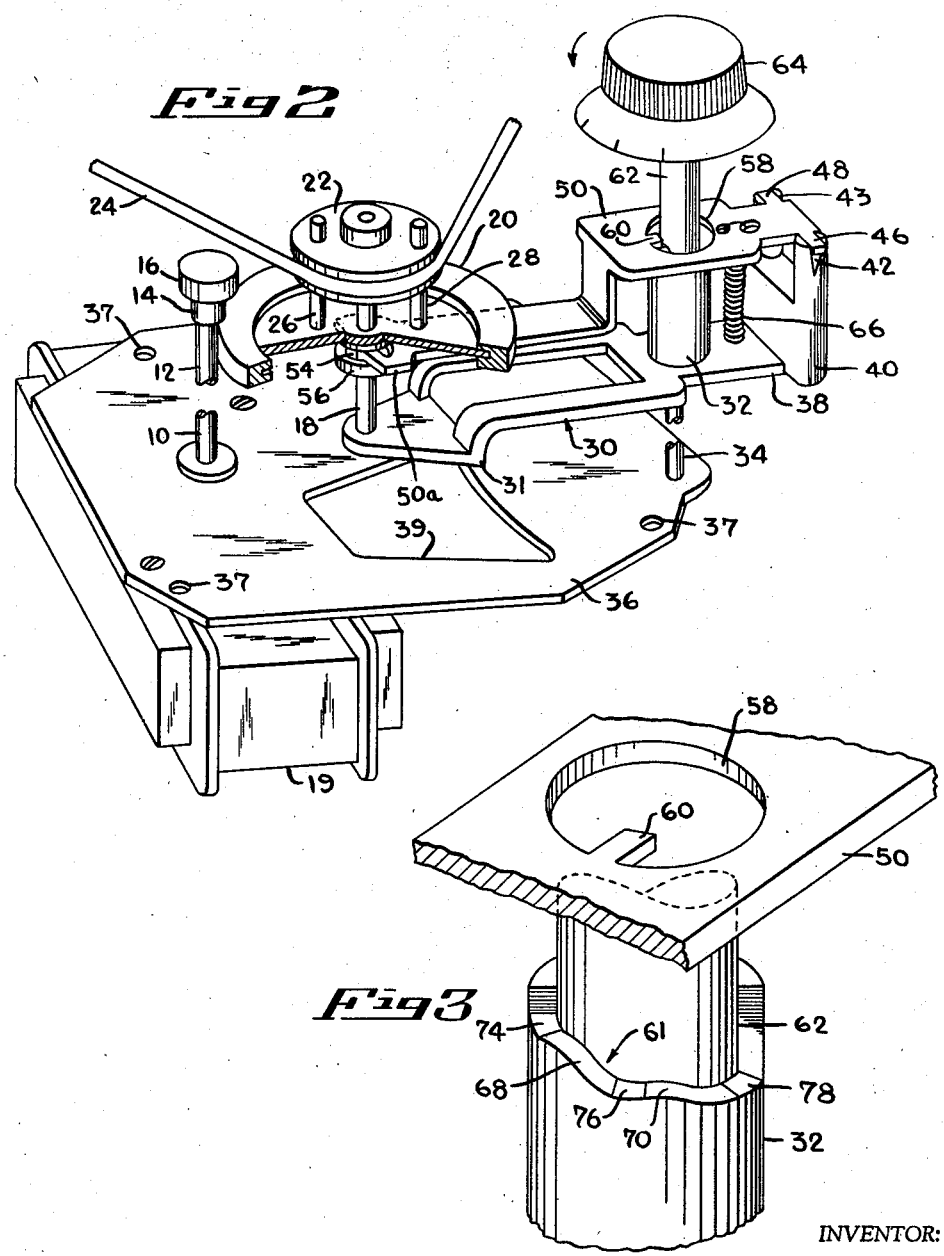

United States Patent Office 2,891,409
Patented June 23, 1959

2,891,409

RECORD CHANGING PHONOGRAPHS

Hans Christian Hansen, Klampenborg, Denmark

Original application May 12, 1951, Serial No. 225,946. Divided and this application December 27, 1957, Serial No. 705,629

Claims priority, application Denmark March 27, 1951

20 Claims. (Cl. 74—200)

The present application is a divisional application of my application Ser. No. 225,946 filed May 12, 1951 and relates to phonograph driving mechanisms for driving a phonograph turntable at a plurality of predetermined speeds.

It is an object of the invention to provide a driving arrangement that enables the turntable to be driven at a constant speed with little deviation from the nominal speed and which therefore will be suitable for high fidelity reproduction.

A further object of the invention is to provide a phonograph driving arrangement for driving the phonograph turntable at a plurality of predetermined speeds in which a driving pulley is arranged independent of the turntable and in which the driving unit includes a driving belt that passes round the turntable and the driving pulley.

A further object of the invention is to provide a driving arrangement including an elastic belt and in which the elastic belt can be dimensioned to absorb a substantial part of the irregularities so as to thereby obtain a decrease of the so-called "wow."

Further objects and advantages of my invention will appear from the following specification, in which the invention is now described with reference to the accompanying drawing, in which Figure 1 is a perspective view, partly in section, of a phonograph driving arrangement according to the invention, Figure 2 is an exploded perspective view of the motor driving mechanism, and Figure 3 is an exploded detail of the motor driving mechanism.

In Figure 1, 9 is a chassis plate of a phonograph having a turntable 13 rotatably supported in a manner not shown. The turntable has a peripheral flange provided with an exterior annular recess 15 so as to give the turntable the character of a large pulley which is driven by means of an elastic belt 24 from a driving pulley 22.

The arrangement is more specifically shown in Figure 2. The pulley 22 is rotatably supported on a spindle 18 which also supports a friction gear wheel 20 adapted to engage and be driven from a power spindle 10 of an electric motor 19 which is not shown in detail.

The driving mechanism to be described hereinafter is constructed so as to enable the turntable to be rotated with a selected one of three different predetermined speeds. To this purpose the motor spindle 10 is provided with three sections 12, 14 and 16 of different diameters adapted to be selectively engaged by the friction wheel 20 which can be axially displaced.

In spaced relationship to and substantially parallel with the spindle 10 and the spindle 18 a further spindle 34 is mounted on a motor base plate 36 having holes or the like 37 for mounting the driving mechanism below the chassis plate 9. A pair of pins 26, 28 on the friction wheel 20 extends through holes in the pulley 22 to couple the friction wheel 20 and the pulley 22 to rotate together.

The spindle 18 is mounted on the free end of an arm 30, and the structure including the friction wheel 20 and the pulley 22 and the pulley 22 is allowed to rotate freely on the spindle 18. The pulley 22 is secured against longitudinal displacement relatively to the spindle 18 while the friction wheel 20 is mounted for axially displacement along the spindle 18.

The arm 30 is supported on a sleeve 32 which is mounted to turn on the spindle 34. Behind the sleeve 32 the arm 30 has an extension 38, the end of which is provided with a pedestal 40 which has two upwardly extending projections with recessed top ends of which only the front recess 42 is shown. These recesses form bearings for oppositely extending projections 46 and 48 on the rear end of a pivotable arm 50, the front end of which is bifurcated and engages in a circular groove 54 on a hub 56 secured to the friction wheel 20 so as to cause axial displacement of the friction wheel in response to tilting of the arm 50.

The arm 50 is provided with an aperture 58, Figure 3, having an inwardly directed cam projection 60, which is adapted to engage a cam member, generally referred to as 61 and in the form of portions of an upwardly facing shoulder on the sleeve 32. The sleeve has a top portion of reduced diameter 62, which extends upwardly through the aperture 58 and forms spindle for a control knob or the like 64 which extends above the top surface of the chassis plate 9, see Figure 1.

Between the arm 50 and the rear end of the arm 30 a tension spring 66 is provided urging the arm downward to engage the projection 60 against the cam 61. The cam 61 is composed of two inclined sections 68 and 70 respectively between which a flat section 76 is arranged in a notch, the width of which corresponds to the width of the projection 60. At the top of the sections 68 a similar flat section 74 is provided, and at the bottom of the section 70 a third flat section 78 is provided. The notches 74, 76, and 78 extend to a depth sufficient for positive engagement with the projection 60 to be fixed therein. Preferably the edges between the notches and the adjacent inclined sections 68 and 70 respectively are rounded or slightly inclined. The whole arm structure 30, 50 is arranged to swing horizontally; the front end of the arm 30 is cracked at 31, see Figure 2, and extends into an aperture 39 in the base plate 36 so that the swinging of the arm is limited.

Under normal driving conditions the driving belt 24 which may be of rubber or other elastic material is tightened so as to engage the friction wheel 20 against one of the sections 12, 14, or 16 so that the rotation of the motor spindle 10 is transmitted through the friction wheel 20, the pulley 22, and the belt 24 to the turntable 13.

For setting the speed of the turntable the knob 64 is turned so as to locate one of the flat portions 74, 76 or 78 of the cam 61 in engagement with the projection 60. Thus, if the uppermost recess 74 is engaged with the projection 60, the pivoted arm 50 is tilted to its upper position in which the friction wheel 20 engages the largest spindle section 16. When it is desired to select the intermediate speed, the knob 64 is turned clockwise so as to disengage the notch 74 from the projection 60 and turn the sleeve 32 with the projection 60 sliding down the inclined surface 68 until it engages the notch 76. The spring 66 serves to keep the arm 50 in engagement with the cam portions. Further clockwise turning of the knob 64 and rotation of the sleeve 32 until the projection 60 is engaged by the notch 78 cause selection of the lowest speed when the friction wheel 20 engages the smallest spindle section 12.

When changing from a lower to a higher speed, the knob 64 is turned anticlockwise. In this case the projection 60 must climb the inclined cam portions and the tension of the spring will resist such climbing with the result that the turning of the knob and the sleeve initially will cause the arm structure 30, 50 to be swung anti-clockwise against the tension of the belt 24 with the friction wheel disengaging the motor spindle to a position in which the front end of the arm 30 engages the edge of the aperture 39. In this position of the arm structure the projection 60 climbs the inclined cam portion 70 to the notch 76 against the action of the spring 66, and when the knob 64 is released with the friction wheel 20 in the plane of the spindle section 14 the friction wheel 20 will re-engage the spindle due to the tension of the belt 24. A similar operation of the knob 64 will enable displacement of the drive so that the friction wheel is in engagement with the driving section 16.

From the above specification it will be understood that my invention comprises a driving belt having elastic properties that pass in the peripheral recess of the turntable and further pass over the driving pulley. The driving pulley is spaced from the periphery of the turntable. Further the driving pulley is maintained substantially in the plane comprising the recess in the periphery of the turntable. The gear wheels are displaced independently of the position of the driving pulley which is always maintained in this plane.

By designing the driving arrangement in this manner I avoid having a driving roller engaging the flange of the turntable. According to my invention the driving connection is the elastic belt only.

This feature has several advantages. Thus for example it is possible to let the elasticity of the driving belt adsorb a substantial part of the irregularities so as to thereby obtain a decrease in the so-called "wow" which means the deviation from the nominal speed of the turntable.

I claim:

1. A phonograph driving arrangement for driving a phonograph turntable at a plurality of different selectable speeds including in combination: a turntable structure including a turntable having a peripheral flange and an annular exterior recess in said flange, an electric motor having a power spindle including a plurality of driving portions of different diameter, an auxiliary spindle in spaced relationship to said motor spindle, a pulley rotatably arranged on said spindle, means for retaining said pulley in a plane substantially parallel with the plane through said turntable recess, a friction gear wheel on said auxiliary spindle mounted for rotation thereon as well as axial displacement to assume a plurality of positions in which it is operable to selectively engage any one of said motor spindle driving sections, an elastic driving belt for said turntable passing over said pulley and in said turntable recess and operable to urge said friction gear wheel against said motor spindle, a transmission between said friction gear wheel and said pulley operable to cause said pulley to rotate with said friction gear wheel when driven from said motor spindle, a speed selector arrangement comprising a speed selector member designed to be turned by hand, a speed selector spindle connected with said speed selector member and disposed in spaced parallel relationship from said motor spindle and said auxiliary spindle, said speed selector spindle having a lever structure including a swingingly arranged arm extending laterally from said speed selector spindle and on which said auxiliary spindle is supported to be swung to disengage said friction gear wheel from said motor spindle when said speed selector spindle is turned in a predetermined direction and a lever supported to tilt vertical to said swingingly arranged lever against resilient action and being in engagement with said friction gear wheel for axially displacing the latter along said auxiliary spindle, a cam structure including a plurality of cam portions distributed around said speed selector spindle operable to engage with a portion of said tiltable lever for holding said tiltable lever in a selectable number of tilted positions with said friction gear wheel in different planes for engaging each of said driving portions of said motor spindle, and a plurality of inclined cam portions for tilting said lever in response to turning of said speed selector spindle in said predetermined direction to cause said cam engaging portion of said tiltable lever to climb said inclined portions and in response to said climbing to cause said lever structure to be swung to disengage said friction gear wheel from said motor spindle against the elasticity of the driving belt.

2. A phonograph driving arrangement for driving a phonograph turntable at a plurality of different selectable speeds including in combination: a turntable structure including a turntable having a peripheral flange and an annular exterior recess in said flange, an electric motor having a power spindle including a plurality of driving portions of different diameter, an auxiliary spindle in spaced relationship to said motor spindle, a pulley rotatably arranged on said spindle, means for retaining said pulley in a plane substantially parallel with the plane through said turntable recess, a friction gear wheel on said auxiliary spindle mounted for rotation thereon as well as axial displacement to assume a plurality of positions in which it is operable to selectively engage any one of said motor spindle driving sections, an elastic driving belt for said turntable passing over said pulley and in said turntable recess and operable to urge said friction gear wheel against said motor spindle, a transmission between said friction gear wheel and said pulley operable to cause said pulley to rotate with said friction gear wheel when driven from said motor spindle, an arm supporting said auxiliary spindle and arranged to swing to move said auxiliary spindle away from said motor spindle to disengage said friction gear wheel therefrom, a pivotable arm arranged to swing together with said swingingly arranged arm as well as to tilt in a direction perpendicular thereto and having a portion in operative connection with said friction gear wheel for displacing the latter axially on said auxiliary spindle in response to tilting of said pivotable arm, a cam arrangement including a cam member having a plurality of portions operable to swing both said arms as well as to tilt said pivotable arm, and a plurality of portions operable to hold said pivotable arm in a plurality of tilted positions, in each of which said friction gear wheel is disposed for being engaged against a selected one of said driving spindle portions caused by the tension of said elastic belt, and a member designed to be turned by hand in a predetermined direction for rendering said cam arrangement operative to swing said arms to disengage said friction gear wheel from said driving spindle against the tension of said elastic belt and to shift said pivotable arm to assume a predetermined one of its tilted positions.

3. A phonograph driving arrangement for driving a phonograph turntable at a plurality of different selectable speeds including in combination: a turntable structure including a turntable having a flange and an annular exterior recess in said flange, an electric motor having a power spindle including a plurality of driving portions of different diameter, an auxiliary spindle in spaced parallel relationship to said motor spindle, a pulley rotatably arranged on said spindle in a plane substantially parallel with the plane through said turntable recess, an elastic driving belt for said turntable passing over said pulley in said turntable recess and operable to urge said friction gear wheel against said motor spindle, a rotatably arranged gear wheel on said auxiliary spindle in driving connection with said pulley and mounted for axial displacement to assume a plurality of positions in which it is operable to selectively engage any one of said motor spindle driving sections, a supporting structure for said auxiliary spindle movable to swing said auxiliary spindle away from said motor spindle to disengage said friction gear wheel therefrom, and including a pivotable arm arranged to tilt and being in operative connection with said friction gear wheel for displacing the latter axially on said auxiliary spindle when tilted, a cam arrangement including a cam member having a plurality of portions operable to swing said supporting structure and to tilt said pivotable arm and a plurality of tilted positions in each of which said friction gear wheel is disposed for being engaged against a selected one of said driving spindle portions caused by the tension of said elastic belt, and a member designed to be turned by hand in a predetermined direction for rendering said cam arrangement operative to swing said supporting structure to disengage said friction gear wheel from said driving spindle against the tension of said elastic belt and to shift said cams to said pivotable arm to assume a predetermined one of its tilted positions.

4. A phonograph driving arrangement for driving a phonograph turntable at a plurality of different selectable speeds including in combination: a turntable structure including a turntable having a flange and an annular exterior recess in said flange, an electric motor having a power spindle including a plurality of driving portions of different diameter, an auxiliary spindle in spaced parallel relationship to said motor spindle, a pulley rotatably arranged on said spindle in a plane substantially parallel with the plane through said turntable recess, an elastic driving belt for said turntable passing over said pulley in said turntable recess and operable to urge said friction gear wheel against said motor spindle, a rotatably arranged gear wheel on said auxiliary spindle in driving connection with said pulley and mounted for axial displacement to assume a plurality of positions in which it is operable to selectively engage any one of said motor spindle driving sections, means supporting said auxiliary spindle operable to swing it away from said motor spindle to disengage said friction gear wheel therefrom, a pivotable lever arranged to tilt and in operative connection with said friction gear wheel for displacing the latter axially on said auxiliary spindle, a cam arrangement operable to swing said supporting means and to tilt said pivotable lever between a plurality of positions in each of which said friction gear wheel is disposed for being engaged against a selected one of said driving spindle portions and a control member designed to be turned by hand in a predetermined direction for rendering said cam arrangement operative to swing said supporting structure to disengage said friction gear wheel from said driving spindle and to shift said pivotable lever to assume a selected one of its tilted positions.

5. A phonograph driving arrangement for driving a phonograph at a plurality of different selectable speeds including in combination: a turntable having a depending flange in which an annular exterior recess is provided, an electric motor having a power spindle including a plurality of driving portions of different diameter, an auxiliary spindle in spaced parallel relationship to said motor spindle, a pulley rotatably supported on said spindle retained in a plane substantially parallel with the plane through said turntable recess, a friction gear wheel supported for rotation and axial displacement on said auxiliary spindle and in driving connection with said pulley, means supporting said auxiliary spindle and operable to move said auxiliary spindle away from said motor spindle, means operable to displace said friction gear wheel axially on said auxiliary spindle, a cam arrangement including a cam member having a plurality of portions operable upon rotation to actuate said means to swing said auxiliary spindle away from said motor spindle and to displace said friction gear wheel axially on said auxiliary spindle, and a plurality of portions operable to hold said friction gear wheel displacing means in a plurality of positions in each of which said friction gear wheel is disposed for being engaged against a selected one of said driving spindle portions, an elastic driving belt passing over said pulley and said turntable flange recess operable to swing said supporting means against said motor spindle to cause driving engagement between said motor spindle and said friction gear wheel, and a member adapted to be turned by hand in a predetermined direction for rotating said cam member.

6. In a phonograph driving arrangement in combination: a turntable having a flange including an annular exterior recess, a motor having a driving spindle including a plurality of driving portions of different diameter, a driven structure in spaced relationship to said motor spindle and including a pulley rotatably retained in a plane substantially parallel with the plane through said turntable recess, and a friction gear wheel in driving connection with said pulley and mounted for rotation as well as axial displacement along said motor spindle to assume a plurality of positions in each of which it is operable to engage one of said motor spindle driving sections to be driven therefrom, an elastic driving belt for said turntable passing over said pulley and in said turntable recess, an arm structure supporting said driven structure including a pivotable member operable to displace said friction gear wheel axially, manually operable control means for tilting said pivotable member, and means for retaining said pivotable member in a plurality of positions with said friction gear wheel in position to be driven from each of said motor spindle portions.

7. In a phonograph driving arrangement in combination: a turntable having a flange including an annular exterior recess, a motor having a driving spindle including a plurality of driving portions of different diameter, a driven structure in spaced relationship to said motor spindle and including a pulley rotatably retained in a plane substantially parallel with the plane through said turntable recess, and a friction gear wheel in driving connection with said pulley and mounted for rotation as well as axial displacement along said motor spindle to assume a plurality of positions in each of which it is operable to engage one of said motor spindle driving sections to be driven therefrom, an elastic driving belt for said turntable passing over said pulley and in said turntable recess, an arm structure supporting said driven structure including a pivotable member operable to displace said friction gear wheel axially, manually operable control means for tilting said pivotable member, including a spring load on said pivotable member and a cam structure operable to pivot said member between a plurality of positions in each of which said friction gear wheel is in operative position to engage one of said motor spindle portions to be driven thereby, said cam structure further being operable to disengage said driven structure from said motor spindle when shifting said friction wheel between a section of smaller diameter and a section of larger diameter.

8. In a phonograph driving arrangement for driving a phonograph turntable at a plurality of different selectable speeds and including an electric motor having a driving spindle with a plurality of portions of different diameter to be selectively engaged by a shiftable driven gear wheel which is in driving connection with said turntable, the improvement that said shiftable gear wheel is in driving connection with an intermediate gear wheel mounted to rotate with said friction gear wheel and retained in a predetermined plane with a portion of said turntable which is provided with an exterior annular recess and that an elastic driving belt passes over said pulley and said turntable guided in the annular recess in said turntable portion and operates to urge said friction gear wheel into driving engagement with said motor spindle, and that further shifting means for said friction gear wheel is provided including a manually operable speed selector member adapted to be turned, a cam arrangement turning with said speed selector member and having inclined portions as well as flat portions, an auxiliary mounting structure for said friction gear wheel and said pulley, including a member operable to displace said gear wheel by engagement with said inclined portions and position said gear wheel to selectively engage each of said driving spindle portions by the engagement of each of said flat cam portions, said supporting structure further including a member movable in response to resistance against the climbing of said first member up said inclined cam portions to cause said friction gear wheel to be disengaged from said motor spindle during its displacement.

9. In a phonograph driving arrangement for driving a phonograph at a plurality of different selectable speeds and including an electric motor having a driving spindle with a plurality of portions of different diameter to be selectively engaged by a shiftable driven gear wheel which is in driving connection with said turntable, the improvement that said shiftable gear wheel is in driving connection with an intermediate gear wheel mounted to rotate with said friction gear wheel and retained in a predetermined plane with a portion of said turntable which is provided with an exterior annular recess and that an elastic driving belt passes over said pulley and said turntable guided in the annular recess in said turntable portion and operates to urge said friction gear wheel into driving engagement with said motor spindle, and that further shifting means for said friction gear wheel is provided including a manually operable speed selector member adapted to be turned, a shifting arrangement for said shiftable gear wheel turning with said speed selector member including a mounting structure for said friction gear wheel and said pulley, means operable to shift the position of said gear wheel in response to turning of said selector member, and means operable to move said friction gear wheel to be disengaged from said motor spindle during its shifting.

10. In a phonograph driving arrangement for driving a phonograph turntable at a plurality of different selectable speeds to be selected by turning a speed selector knob, and including an electric motor having a driving spindle with a plurality of portions of different diameter to be selectively engaged by a driven gear wheel operatively connected to be shifted by turning said selector knob and which is in driving connection with said turntable, the improvement that said shiftable gear wheel is in driving connection with an intermediate gear wheel mounted to rotate with said friction gear wheel and retained in a predetermined plane with a portion of said turntable which is provided with an exterior annular recess and that an elastic driving belt passes over said pulley and said turntable guided in the annular recess in said turntable portion and operates to urge said friction gear wheel into driving engagement with said motor spindle, and that said shifting connection between said friction gear wheel and said speed selector knob includes a cam member movable with said speed selector knob, means cooperating with said cam member for shifting said gear wheel and for temporarily disengaging it from said motor spindle when shifted from a lower to a higher speed.

11. In a phonograph driving arrangement for driving a phonograph turntable at a plurality of different selectable speeds to be selected by turning a speed selector knob, and including an electric motor having a driving spindle with a plurality of portions of different diameter to be selectively engaged by a driven gear wheel operatively connected to be shifted by turning said selector knob and which is in driving connection with said turntable, the improvement that said shiftable gear wheel is in driving connection with an intermediate gear wheel mounted to rotate with said friction gear wheel and retained in a predetermined plane with a portion of said turntable which is provided with an exterior annular recess and that an elastic driving belt passes over said pulley and said turntable guided in the annular recess in said turntable portion and operates to urge said friction gear wheel into driving engagement with said motor spindle.

12. In a phonograph driving arrangement for driving a phonograph turntable at a plurality of different selectable speeds and including an electric motor having a driving spindle, a driven member in driving connection with said turntable, a shiftable driven gear member operable to drive said driven member, and manual means for shifting said gear member to be driven from said motor spindle at a plurality of different speeds the improvement that a pulley is mounted to rotate with said driven member and mounted to rotate therewith in a predetermined plane with a portion of said turntable which is provided with an exterior annular recess, and that an elastic driving belt passes over said pulley and said turntable guided in the annular recess in said turntable portion and operates to urge said gear member into driving engagement with said motor spindle.

13. In a phonograph driving arrangement for driving a phonograph at a plurality of different selectable speeds the combination with an electric motor having a driving spindle and a shiftable driven gear arrangement having a part in driving connection with said turntable the improvement that said shiftable gear arrangement includes a driven pulley mounted for rotation in a predetermined plane, that said turntable has a portion including an exterior annular recess in the plane of said pulley, and that an elastic driving belt passes over said pulley and said turntable guided in the annular recess in said turntable portion.

14. A phonograph driving arrangement comprising a turntable having a substantially flat disc-shaped portion and a flange extending substantially perpendicular to said disc-shaped portion and an annular recess in said flange, a power driven spindle having a plurality of driving sections of different diameters, a second spindle in spaced relationship relatively to said power driven spindle, a pulley and a friction wheel mounted on said second spindle with said pulley in spaced relationship to said turntable flange and maintained substantially in the plane of said recess in said flange, an elastic driving belt surrounding said turntable and said pulley passing over said pulley and passing in said recess of said flange of said turntable, said pulley and said friction wheel being mounted on said spindle by means preventing relative rotation of said pulley and said wheel, said means allowing a longitudinal displacement of said friction wheel along said second spindle, and speed setting means operable at will having a plurality of predetermined positions for setting said friction wheel in any one of a plurality of predetermined positions along said spindle, in which said friction wheel is capable of engaging one of said driving sections of said power driven spindle to thereby drive said turntable at a selected one of a plurality of predetermined speeds.

15. A phonograph driving arrangement comprising: a turntable having a substantially flat disc-shaped portion and a flange extending substantially perpendicular to said disc-shaped portion and an annular recess in said flange, a power driven spindle having a plurality of driving sections of different diameters, a second spindle in spaced relationship relatively to said power driven spindle, a pulley and a friction wheel mounted on said second spindle with said pulley in spaced relationship to said turntable flange and maintained substantially in the plane of said recess in said flange, an elastic driving belt surrounding said turntable and said pulley passing over said pulley and passing in said recess of said flange of said turntable, said pulley and said friction wheel being mounted on said spindle by means preventing relative rotation of said pulley and said wheel, said means allowing a longitudinal displacement of said friction wheel only along said second spindle to displace said friction wheel to alternately engage any one of said plurality of driving sections of said power driven spindle to thereby drive said turntable at a plurality of predetermined speeds.

16. A phonograph driving mechanism for driving a phonograph turntable at a plurality of predetermined speeds comprising: a turntable structure including a spindle, a disc-shaped portion and a flange portion having a peripheral recess, a power unit structure including a driving spindle having a plurality of driving sections of different diameter, a spindle substantially parallel with said driving spindle and remote from said turntable periphery, a pulley on said spindle located substantially in a plane comprising said recess on the periphery of said turntable, a friction wheel longitudinally displaceable along said spindle to assume a plurality of predetermined positions in which it engages any one of said plurality of driving sections of different diameter of said motor spindle, an elastic belt passing in said peripheral recess on said turntable and further passing over said driving pulley, said elastic belt being tensioned to keep said displaceable friction wheel in engagement with any one of said driving sections, and means for shifting said friction wheel for selectively driving said pulley from each of said plurality of motor spindle sections.

17. A phonograph driving mechanism for driving a phonograph turntable at a plurality of predetermined speeds comprising: a turntable structure including a spindle, a disc-shaped portion and a flange portion having a peripheral exterior recess, a power unit structure including a driving spindle having a plurality of driving sections of different diameter, a spindle substantially parallel with said driving spindle and remote from said turntable periphery, a pulley on said spindle located substantially in a plane comprising said recess on the periphery of said turntable, a friction wheel longitudinally displaceable along said spindle to assume a plurality of predetermined positions in each of which it engages any one of said plurality of driving sections of different diameter of said motor spindle, an elastic belt passing in said peripheral recess on said turntable and further passing over said driving pulley, and means for shifting said friction wheel for driving said pulley at a plurality of predetermined speeds.

18. A phonograph driving mechanism for driving a phonograph turntable at a plurality of predetermined speeds comprising: a turntable having a spindle and an annular recess, a motor having a driving spindle, a spindle having a driving pulley substantially parallel with said motor spindle and in spaced relationship to the periphery of said turntable, an elastic driving belt passing in said peripheral recess of said turntable and further passing over said driving pulley, means for maintaining said pulley substantially in a plane comprising said annular recess of said turntable, and driving means including variable gear means for driving said pulley from said motor spindle at a plurality of predetermined speeds.

19. A phonograph driving arrangement comprising: a turntable having a flange extending substantially perpendicular to the turntable and an exterior annular recess in said flange, a driving pulley in spaced relationship to said turntable and maintained substantially in the plane of said recess in said flange, an elastic driving belt surrounding said turntable and said pulley passing over said pulley and passing in said recess of said flange of said turntable, a power driven spindle for driving said pulley and having a plurality of driving sections each assigned to a different speed, a friction wheel interposed between said power driven spindle and said pulley, and arranged to be engaged against said driving spindle, and means operable at will to displace said friction wheel to alternately engage any one of said driving sections of said driving spindle to thereby drive said turntable at a plurality of predetermined speeds.

20. A phonograph driving mechanism for driving a phonograph turntable at a plurality of predetermined speeds comprising: a turntable having an outwardly facing annular recess to receive a driving belt, a driving pulley in spaced relationship to the periphery of said turntable and disposed in a plane comprising said recess, an elastic belt passing over said pulley in said recess, and driving means including gear shift means for driving said pulley at a plurality of predetermined speeds.

References Cited in the file of this patent

UNITED STATES PATENTS

| 2,381,079 | Pittman | Aug. 7, 1945 |
| 2,585,460 | Halahan | Feb. 12, 1952 |
| 2,801,546 | Scheller | Aug. 6, 1957 |

FOREIGN PATENTS

| 1,031,063 | France | June 19, 1953 |
| 1,071,735 | France | Sept. 3, 1954 |
| 526,126 | Canada | June 12, 1956 |